United States Patent [19]
Gavit

[11] Patent Number: 5,737,153
[45] Date of Patent: Apr. 7, 1998

[54] POSITIONING ASSEMBLY FOR RECORDING HEADS IN ELECTRONIC RECORDING DEVICES

[76] Inventor: Stephen E. Gavit, 11480 W. Bear Creek Dr., Lakewood, Colo. 80227

[21] Appl. No.: 588,211

[22] Filed: Jan. 19, 1996

[51] Int. Cl.$^6$ .............................. G11B 5/55; G11B 21/08
[52] U.S. Cl. .................................................. 360/106
[58] Field of Search ............................................. 360/106

[56] References Cited

U.S. PATENT DOCUMENTS

| | | | |
|---|---|---|---|
| 3,370,131 | 2/1968 | Reed | 360/106 |
| 3,705,270 | 12/1972 | Huber | 360/106 |
| 3,839,737 | 10/1974 | Vogel | 360/106 |

*Primary Examiner*—Robert S. Tupper
*Attorney, Agent, or Firm*—Timothy J. Martin; Michael R. Henson

[57] ABSTRACT

A positioning mechanism positions a transducer along a linear axis relative to a support structure and includes a movable mount for the transducer, a rotatable cam element with camming structure that is maintained in contact with the movable mount and a rotatable drive to rotate the cam element. The cam element is preferably a wheel with angularly spaced openings with spherical balls of different diameters disposed in respective ones of the openings to define the camming structure. Alternatively, the camming structure may be a continuous or a stepped annular ramp around the surface of a disc-shaped member. The movable mount is a shaft and a shuttle that support the transducer with the shaft slideably received between two opposed pieces of a yoke-shaped support arm. The shaft is spring biased against the cam element. The drive is a servo motor, a stepper motor or a solenoid, and an encoder operates to sense the rotational orientation of the cam element.

17 Claims, 5 Drawing Sheets

POSITIONING ASSEMBLY FOR RECORDING HEADS IN ELECTRONIC RECORDING DEVICES

FIELD OF THE INVENTION

The present invention broadly concerns electronic recording devices and particularly concerns supports used to position read/write recording heads, especially for selected, reciprocal translational movement for multi-track recording. The present invention, then, contemplates increasing the density of recorded data on a selected medium, such as magnetic or laser tape, by moving the read/write recording head or laser device along a linear axis transversely to movement of the recording medium so that a plurality of recorded tracks may be made by each transducer in the head.

BACKGROUND OF THE INVENTION

Although the need to store data for commerce and industry has existed since the beginning of time, the advent of the computer processor has seen an exponential growth in the desire and ability to store information for subsequent retrieval. Various types of devices have accordingly been developed to store data both for on-line usage as well as for archival purposes.

Where on-line processing requires data to be readily at hand, a significant improvement was provided by the advent of the magnetic disk storage array. Here, one or more magnetic disks are provided, and a read/write recording head is used to record information on the disk as well as to retrieve information or data for use by the computer processor. Significant strides have been made in the ability to increase the density of data stored on such magnetic disk arrays.

In order to gain an even higher density for online data, the optical disk was developed. These devices record data based upon a very small wavelength of light so that a higher density is obtained due to this technique. Laser light is employed to read the stored information or data on the optical disk. However, once imprinted, the disk presently cannot be rewritten although significant research is underway in an effort to develop such technology.

In early days of the computer, before the advent of the magnetic disks and the optical disk storage assemblies, data was typically stored on magnetic tapes, such as reel-to-reel tapes and later cassettes. In a magnetic tape storage device, a magnetic coil is used as a transducer both to imprint data magnetically on a moving band of magnetic film; thereafter, when the film is advanced across the transducer, the data may be read and re-input into a co-processor. Magnetic tape can be erased and rewritten many times and has an advantage of low cost.

Magnetic tape is still a highly desirable format for archiving data for rapid access is of less significance and cost is of concern. However, where vast quantities of data are to be maintained, these tapes can be bulky due to the physical number necessary to store the quantity of data. The capacity for such tapes to store data, of course, is dependent upon the number of "tracks" which can be independently placed across the width of the tape. Thus, for example, a magnetic tape read/write system that is able to read and write eight tracks of data on a single strip of tape will hold four times the amount of data as a system which only utilizes two tracks. Therefore, efforts to increase the capacity of magnetic tapes to store data have included substantial efforts to increase the number of tracks which can be written on a band of magnetic tape.

In order to increase the density of data stored onto a magnetic tape, one technique has been to support a plurality of individual read/write transducers in an array on the read/write recording head. For example, where eight transducers are placed side-by-side across the head, eight tracks can be simultaneously written or read as the tape is translated across the head and the tape advance direction. In order to provide this number of transducers, however, they may need to be very small in size. Importantly, the reduction in size of the transducer results in a substantial portion of unused magnetic tape in bands extending parallel to and in between each recorded track. Therefore, in order to further increase density, it is now a common practice to write data in between the tracks so that, for example, a tape head that includes sixteen transducers may be first used to record a set of sixteen tracks after which the tape may be rewound and the head shifted half of the distance between the tracks and a set of sixteen more tracks recorded for a total of thirty-two tracks on the tape band. The ability to create multi-track storing, then, becomes dependent upon the precision with which the tape head may be translated to create the different sets of tracks.

In the typical technique for translating a read/write recording head employs a lead screw that is threaded into a threaded nut associated with the tape head. Rotation of the threaded shaft, for example, by a stepper motor, then can translate the tape head a desired distance. While this technique is useful in increasing the ability to do multi-track recording, a lead screw assembly includes an inherent "sloppiness" as a result of the need to have some gaps between the lead screw threads and the threads to avoid binding during use. In order to compensate for this sloppiness, it is known to use threaded lead screws wherein ballbearings reside in the threads to help remove the sloppiness. While this technique does increase precision, a lead screw assembly necessarily has a large mass so that, as the tape head is shifted, substantial momentum and energy must be overcome, especially at the extreme of the translated distance.

Accordingly, there remains a need for improved positioning mechanisms which can more accurately and precisely align the transducers of the tape head for multi-track recording. There is a need for such a positioning mechanism that can retrofit onto existing recording devices with only minor modifications to the structure thereof. There is a further need for such positioning mechanisms which can increase the density of recording on magnetic tape media or laser tape drives.

SUMMARY OF THE INVENTION

It is an object of the present invention to provide a new and useful positioning mechanism, as well as a new and useful read/write recording device incorporating such mechanism, that allows an increase in density in recording data onto a recording medium, such as a magnetic tape.

It is another object of the present invention to provide a simplified positioning mechanism for use with read/write recording devices which positioning mechanism is able to translate a read/write recording head, and thus the transducers carried thereby, in order to produce multi-channel recording.

It is yet another object of the present invention to provide a positioning mechanism which can translate a read/write recording head transversely across a magnetic tape in a manner with increased precision.

In order to accomplish these objects, then, a positioning mechanism according to the present invention is operative to selectively position at least one transducer along the linear axis relative to a support structure which supports the transducer. Broadly, this positioning mechanism includes a movable mount that secures the transducer relative to the support structure. This movable mount may be the recording head itself or another structure which holds the recording head that carries one or more transducers. In any event, the movable mount secures the transducer for reciprocal movement along the linear axis between first and second locations. A rotatable cam element is oriented transversely to the linear axis and has a camming structure defined by a ramp that attacks the movable mount. This ramp varies in dimension along the linear axis so that, as the cam element is rotated, the ramp operates to move the movable mount along the linear axis. A rotatable drive is then operative to selectively rotate the cam element about the rotational axis to position the ramp in the desired position.

In this assembly, a biasing element is operative to apply a restorative force that tends to bias a movable amount toward the first location with the cam element operative to advance the operative to advance the movable mount toward the second location against this storing force. Preferably, the axis of rotation of the cam element is parallel to the linear axis and the rotatable drive may be, for example, a servo motor, a stepper motor, a solenoid or the like. An encoder is then provided to sense the rotational position of the cam element so that the degree of translation may be monitored.

The cam element is preferably a disk shaped member with the camming member being one of alternative construction. Preferably, the camming element is in the form of a disk-shaped retainer that has a plurality of openings disposed equiangularly with respect to one another in the margin proximately to the peripheral edge of the disk-shaped wheel. Differently sized ballbearings are then received in these openings with there being one ballbearing in each opening. These ballbearings travel around a raceway and sequentially contact the movable mount such that the movable mount is positioned at different locations as defined by the diameter of the respective ballbearing attacking the contact surface of the movable mount. In this manner, the raceway defines a reference plane against which translational movement may be registered as defined by the diameter of each ball.

Alternatively, the camming element can be a disk-shaped member that has a ramp that has a constant slope over a majority of its length. The surface of the ramp then contacts the movable element to position it as the ramp changes the thickness of the cam element contacting the movable mount. In yet another alternative embodiment, this ramp is formed by a plurality of steps so that the movable mount may be positioned at a plurality of discrete intermediate locations.

In the preferred structure, a support structure is in the form of a base plate from which a support arm projects. The support arm is in the form of yoke, and the movable mount comprises a shaft that is rotatably journaled within the yoke for modest rotational movement and modest linear movement with respect to a longitudinal axis of the shaft. The biasing element operates to bias the shaft in a first direction while the cam element operates to move the shaft in an opposite direction. The recording head is mounted on a shuttle that is secured to the shaft for common movement therewith. The rotational position of the shaft may be adjusted by a rotational position adjuster assembly associated with the shaft to permit selected rotational positioning of the shaft at a selected shaft orientation. The rotational position adjuster may include a longitudinal V-shaped slot formed in the shaft, a ballbearing disposed in this slot and a pair of bearing retainer plates positioned transversely of the shaft and operative to trap the ball bearing against the shaft at a desired location.

In addition to the positioning mechanism described above, the present invention contemplates a read/write recording device incorporating such a positioning mechanism. Here, the read/write recording device includes a tape drive assembly operative to mount magnetic tape spools (or cartridges) so that a magnetic tape (or cartridge) may be trained and then tracked across the tape head. Tape drives are provided to unwind and rewind the tape, with the tape positioning structure being such that the tape will be translated transversely of the movement of the recording head on the positioning assembly described above.

These and other objects of the present invention will become more readily appreciated and understood from a consideration of the following detailed description of the exemplary embodiments when taken together with the accompanying drawings, in which:

DETAILED DESCRIPTION OF THE EXEMPLARY EMBODIMENTS

The present invention is broadly directed to read/write recording devices adapted to selectively write data onto a recording medium. More particularly, however, this invention concerns a positioning mechanism which is operative to translate one or more transducers carried by a read/write recording head reciprocally in a linear direction that is transverse to the direction of movement of the recording medium passed the recording head. This invention is described specifically with respect to the recording of information and data on a magnetic tape recording medium although it should be understood by the ordinarily skilled person in this field having read this description that this positioning mechanism may be usable with other recording media. For purposes of this description and the claims the term "recording head" will be used to refer to a read only transducer head, a write only transducer head and/or a read/write transducer head. It should also be understood that this invention includes recording and writing in magnetic media optical media or any similar data storage technology now used or hereinafter developed so that the read/write head should be construed to encompass the mechanisms for writing or retrieving such data.

Figure 1:
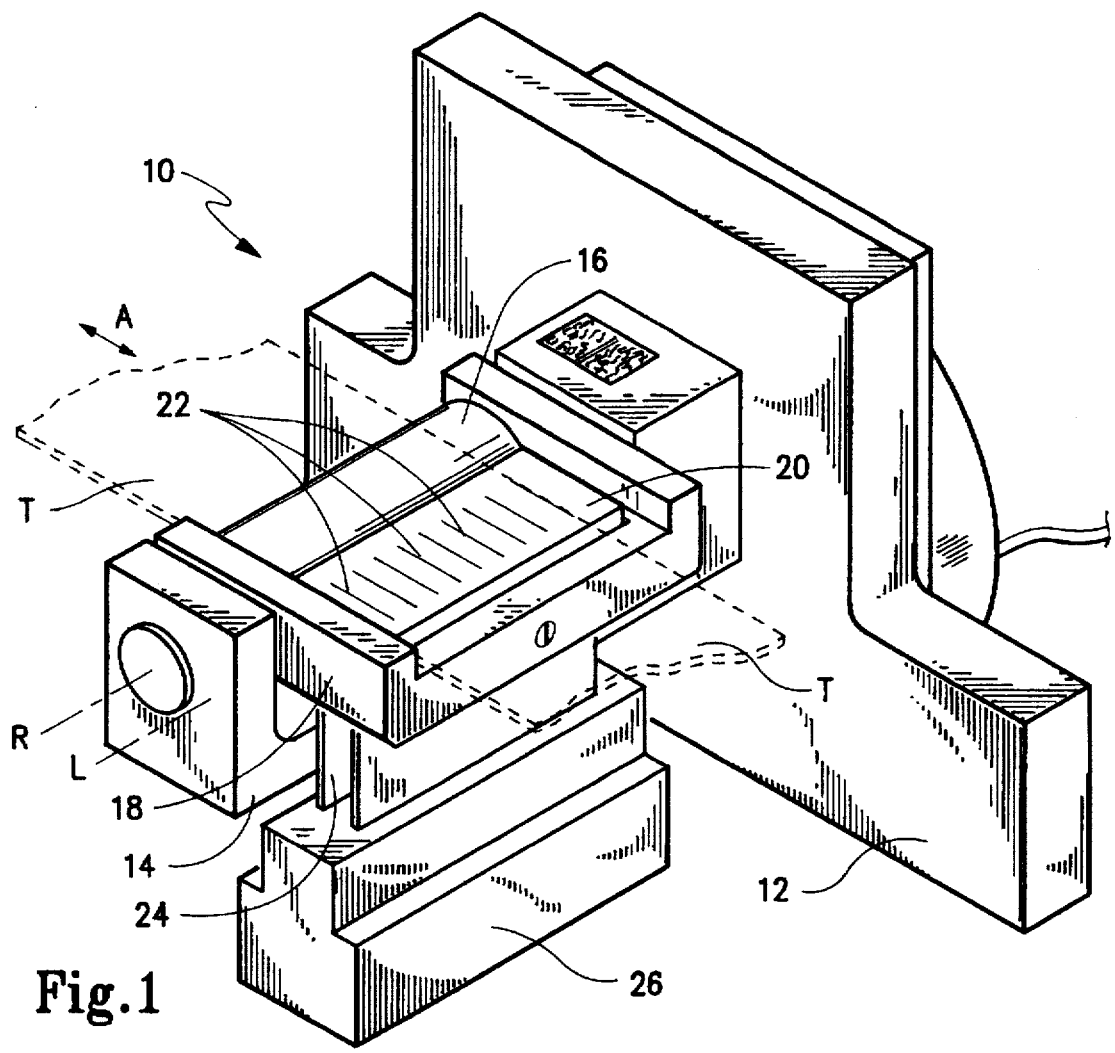
FIG. 1 is a perspective view of a positioning mechanism according to the present invention.
Figure 2:
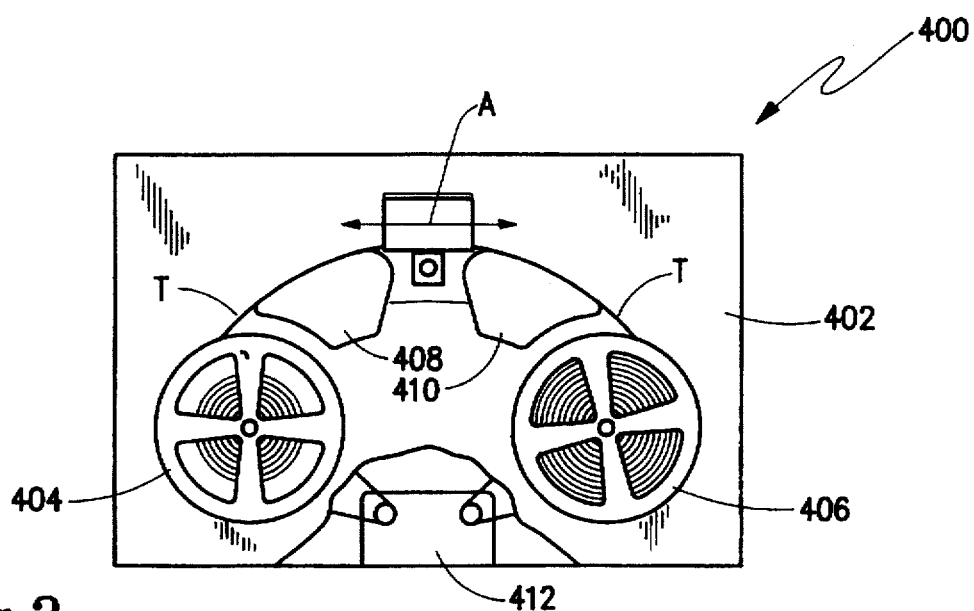
FIG. 2 is a front diagrammatic view of a read/write recording device incorporating the positioning mechanism of FIG. 1.

A positioning mechanism according to the exemplary embodiment of the present invention, then, is broadly shown in FIG. 1 and is shown in a mounted state in FIG. 2 on a read/write recording device. In FIG. 1, it may be seen that positioning mechanism 10 includes a support structure in the form of a base plate 12 that forms a main housing for the device. A support arm 14 projects outwardly from base plate 12 and is rigidly mounted thereto. Support arm 14 is in the form of a yoke that supports a shaft 16 for modest rotational movement about an axis "R". As described more thoroughly below, shaft 16 is also mounted for modest reciprocal linear movement along axis "R". A carriage in the form of shuttle 18 is secured to and keyed onto shaft 16 so that it undergoes corresponding movement when shaft 16 is either rotated or translated relative to axis "R". The shaft 16 and shuttle 18 form a movable mount also as described more thoroughly below.

Shaft 16 and shuttle 18 serve to mount a recording head 20 which includes a plurality of transducers 22 which are disposed in side-by-side relation and which are each capable of recording and/or reading data, for example, onto a magnetic tape "T" shown in phantom. It should be appreciated that tape "T" is driven in the direction of arrow "A" by a suitable tape drive and the specific structure of which is not shown as it forms no part of this invention. However, it should be understood that normally this tape drive will be supported by some framework which also supports base plate 12 and, accordingly, read/write recording device 10. Moreover, it should also be understood that it is important that tape "T" is supported and driven in such a manner that it does not drift transversely of its drive direction "A". Such tape drives, of course, are known in the art.

Accordingly for example with reference to FIG. 2, a diagrammatic representation of a read/write recording device 400 incorporating positioning mechanism 10 includes a framework 402 which rotatably supports a pair of tape spools 404 and 406. Positioning mechanism 10 that carries recording head 20 is supported on framework 402 intermediate of and above spools 404 and 406. Tape "T" is shown trained across positioning mechanism 20 by a pair of suitable tape guides 408 and 410 mounted on framework 402. A tape drive motor 412 drives spools 404 and 406. However, it should be appreciated that FIG. 2 is for illustrative purposes only. The present invention contemplates a variety of drive assemblies and different media structures, including tape spools, tape cartridges, etc., wherein a recording medium travels adjacent a read/write recording head.

With reference again to FIG. 1, recording head 20 includes a flexible wiring harness 24 which connects to an electrical connector 26 which allows access to the recording head by suitable electronics (not shown) to establish electronic communication with transducers 22.

From this description, though, it should be understood that each of transducers 22 are operative to record a "track" of data or information on tape "T". These tracks form a set with the number of tracks in the set being defined by the number of transducers for recording head 20. the width of these tracks is determined by the width of each transducer 22. Currently, such width is primarily within a range of 0.007 to 0.010 inch for transducer used in computer data storage although efforts are being made to reduce the track width to about 0.001 to 0.002 inch. It is known in the art that the density of stored data on tape "T" can be increased by writing additional tracks of information by shifting the recording head 20 linear in the direction of linear axis "L" that is parallel to axis "R" to produce another set of tracks in the spaces between the separation distance of the transducer. The degree of precision and control of this shifting, the number of transducers 22, the spacing between the transducers and the track width, then, determine the number of total tracks which may be recorded or read from tape "T". This invention is directed to such a precision control in the form of a new and useful positioning mechanism that moves the overall support structure for the transducers 22.

Figure 3:
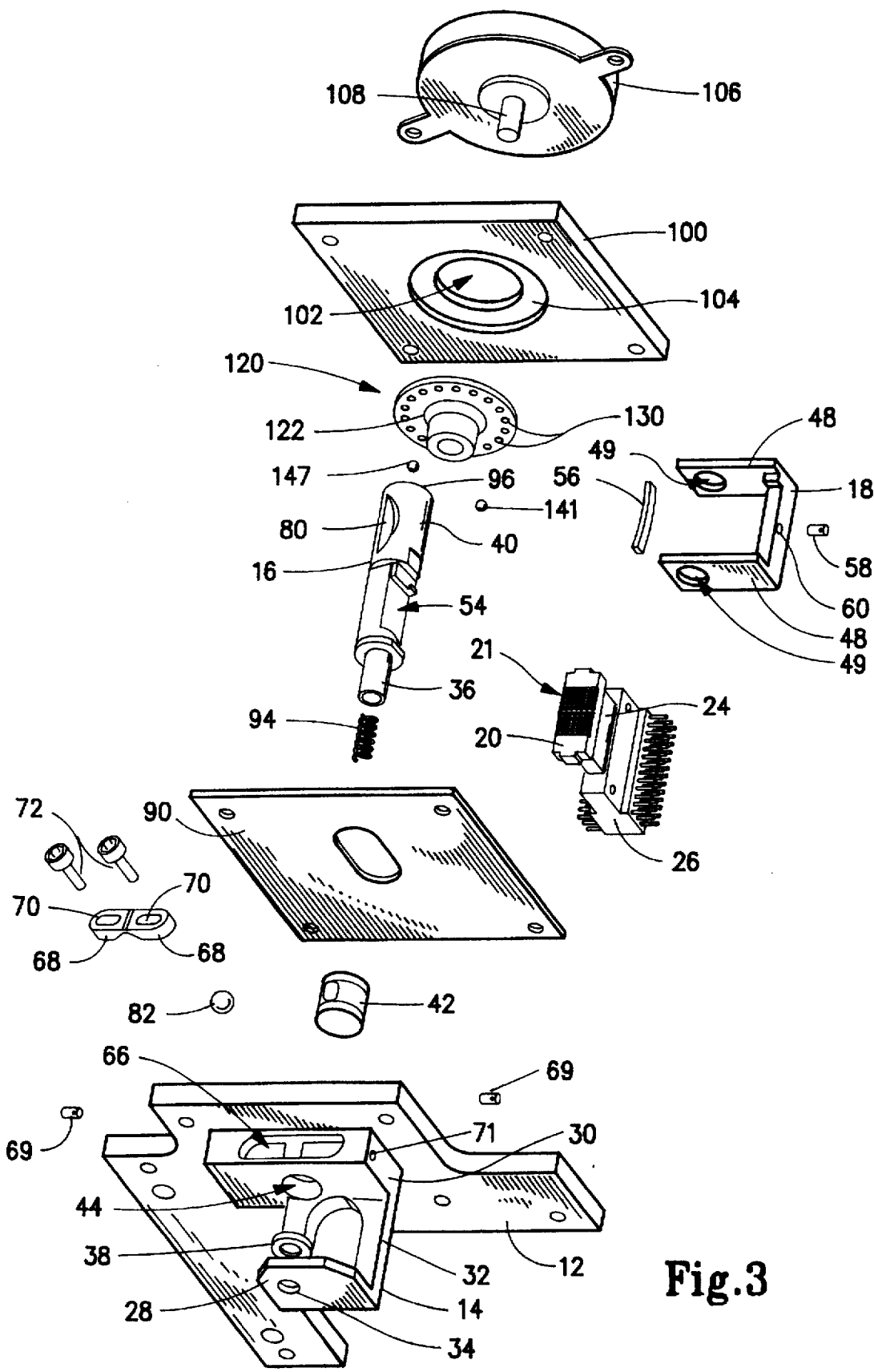
FIG. 3 is an exploded perspective view of a positioning mechanism shown in FIG. 1.
Figure 4:
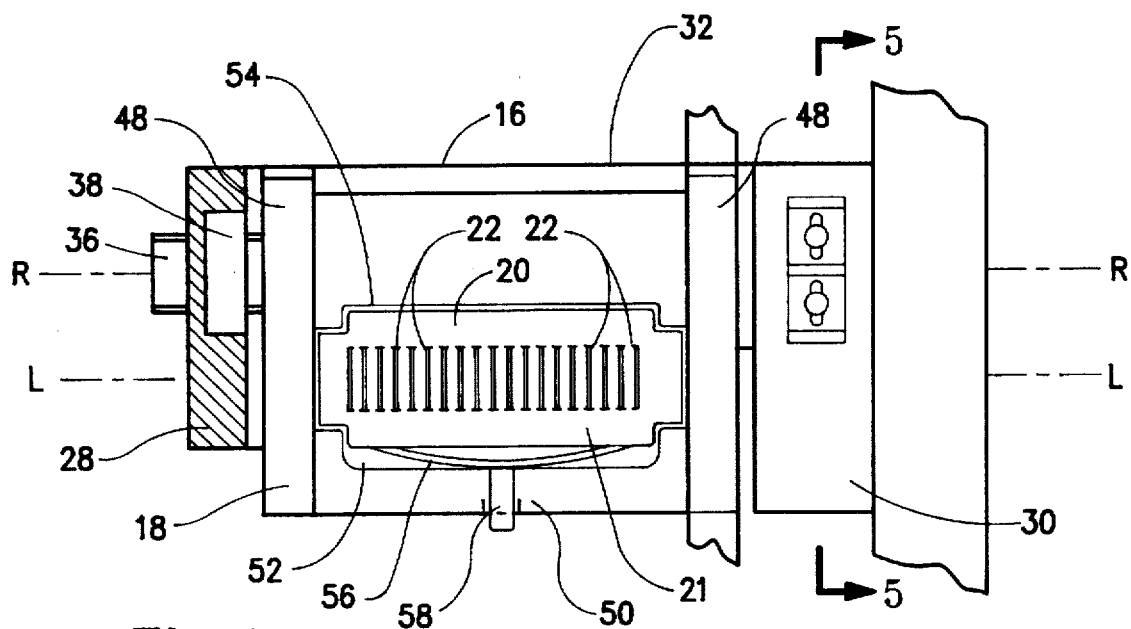
FIG. 4 is a top view, in partial cross-section, showing the mounting of the read/write head in the positioning device of FIG. 1.

The individual parts which are used to construct positioning mechanism 10 are shown in greater detail in FIGS. 3 and 4. With reference first to FIG. 3, it may be seen that support arm 14 is in the form of a yoke having opposed end pieces 28 and 30 which are joined together by a cross-piece 32. Support arm 14 movably mounts shaft 16, as noted above. To this end, end piece 28 is provided with a bore 34 that is sized and adapted to receive a stubshaft 36 on one end of shaft 16 with stubshaft 36 being received through an outer bushing 38 that is mounted in end piece 28. An opposite shaft portion 40 of shaft 16 is received in an inner bushing 42 that is mounted in bore 44 formed in end piece 30.

As may be seen again in reference to FIGS. 3 and 4, shuttle 18 is in the form of a saddle having opposed legs 48 that are joined by base piece 50. Legs 48 have openings 49 that are keyed onto shaft 16 in any convenient manner. When so mounted, an open region 52 is provided between base piece 50 and a slot 52 formed on shaft 16 so that recording head 20 may be disposed therein. To hold recording head 20 in place, a leaf spring 56 is inserted between recording head 20 and base piece 50. Further, a set screw 58 is provided and is received in a threaded bore 60 centrally located in base piece 50 so that, by tightening and loosening set screw 58, the relative spring force of leaf spring 56 on tape head 20 may be adjusted.

Figure 5:
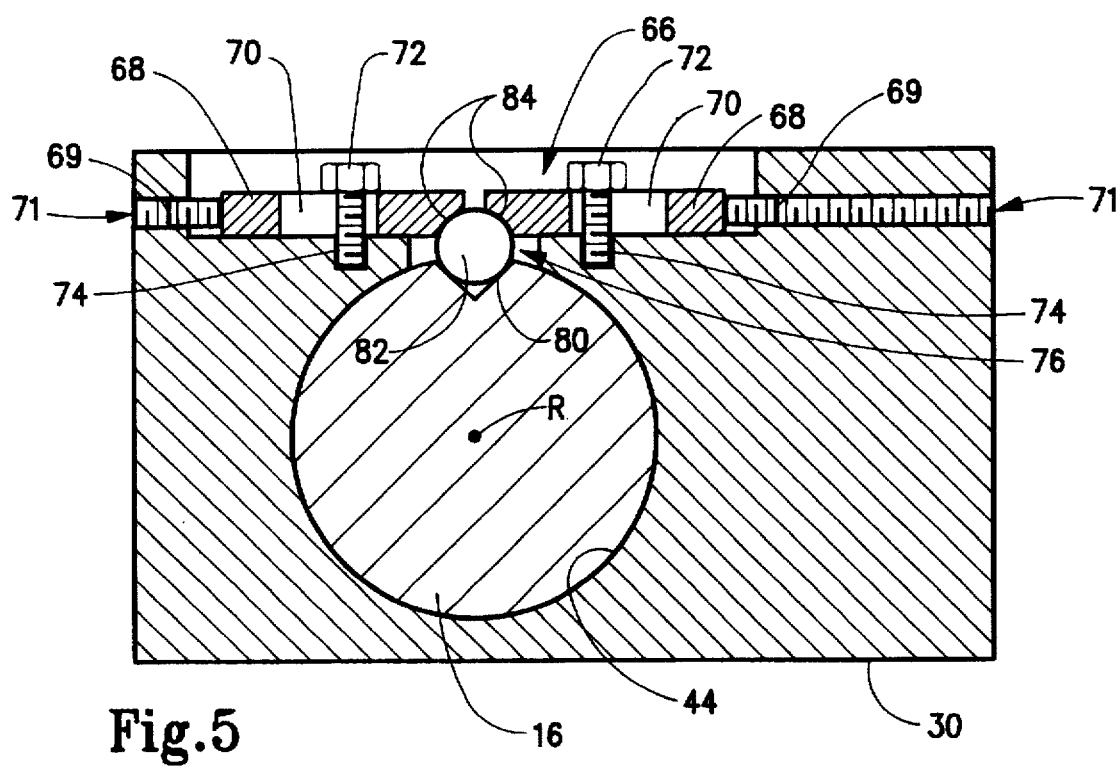
FIG. 5 is a cross-sectional view taken about lines 5—5 of FIG. 4 showing the rotational positioning adjustment for the read/write head of FIG. 3.

With reference to FIGS. 3 and 5, it may be seen that shaft 16 may be adjusted rotationally about longitudinally extending shaft axis "R", with this adjustment being made so that upper face 21 of recording head 20 may be properly aligned. Thus, it should be understood that only a small degree of rotational adjustment is necessary for this device. To accomplish this, as is shown in FIGS. 3–5, end piece 30 of support arm 14 is provided with a channel 66 which receives a pair of adjustment plates 68 which are each provided with slots 70. Plates 68 are secured to channel 66 by means of screws 72 which extend through the respective slots 70 to mate with threaded bores 74. Set screws 69 are threadably received in transverse bores 71 in end piece 30 to transversely adjust the position of plates 68. An opening 76 is provided in channel 66 so that channel 66 communicates with bore 44 in end piece 30. Shaft 16 is provided with a V-shaped channel or slot 80 that extends longitudinally of shaft 16 on its outer peripheral surface. When shaft portion 40 is received in bore 44, slot 80 is located in opening 76 so that a locator ballbearing 82 may be mounted in slot 80 and held into position by angular faces 84 of adjustment plates 68.

From the foregoing structure, it should be understood that small angular adjustment of shaft 16 relative to axis "R" may be accomplished by the transverse adjustment of adjusting plates 68 by loosening screws 72 and sliding plates 68 transversely in channel 66 by adjusting screws 69. After the desired rotational orientation is obtained, screws 72 are tightened to rotationally lock shaft 16 at the desired rotational orientation. However, the rolling movement of ballbearing 82 and bushings 38 and 42 still allow shaft 16 to reciprocally translate or move in a linear direction with respect to axis "R" without changing this angular orientation.

The positioning mechanism according to the present invention which is operative to selectively position each transducer comprising recording head 20 along linear axis "L" relative to the support structure may now be further understood with reference to FIGS. 3 and 6–8. Here, it may be seen that a spacer plate 90 is mounted to base plate 12 opposite support arm 14, with spacer plate 90 having an opening 92 that is sized to receive shaft end portion 94 of shaft 16. A retainer plate 100 abuts spacer plate 90 opposite base plate 12 with retainer plate 100 having a cavity 102 that includes an annular rim 104 which projects radially inwardly into cavity 102. A motor 106 is then mounted onto retainer plate 40 with motor 106 including a shaft 108 that is rotatably driven by motor 106 about a rotational axis "S" that is parallel to both of axes "R" and "L". To this end, motor 106 may be a stepper motor, servo motor, etc. A suitable encoder 110 registers the angular rotational position of shaft 108 and provides this information to controller 112 so that controller 112 can control motor 106 to position shaft 108 at any selected rotational position.

With reference again to FIGS. 3, 5 and 8–9, it may now be seen that a first exemplary embodiment of a rotatable cam element 120 is provided for mounting on shaft 108. In these figures, cam element 120 is in the form of a wheel that includes a retainer disk section 122 and a female sleeve 124 that is sized for mated engagement with shaft 108. A set screw 126 is then received through a threaded bore 128 in the sidewall of sleeve 124 to mount rotatable cam element 120 for common rotation on shaft 108. Disk section 122 includes a plurality of holes 130 equiangularly spaced in a margin 132 proximately to peripheral edge 134. Holes 130 may be of a common size, for manufacturing convenience, or may be of different size if desired.

Figure 6:
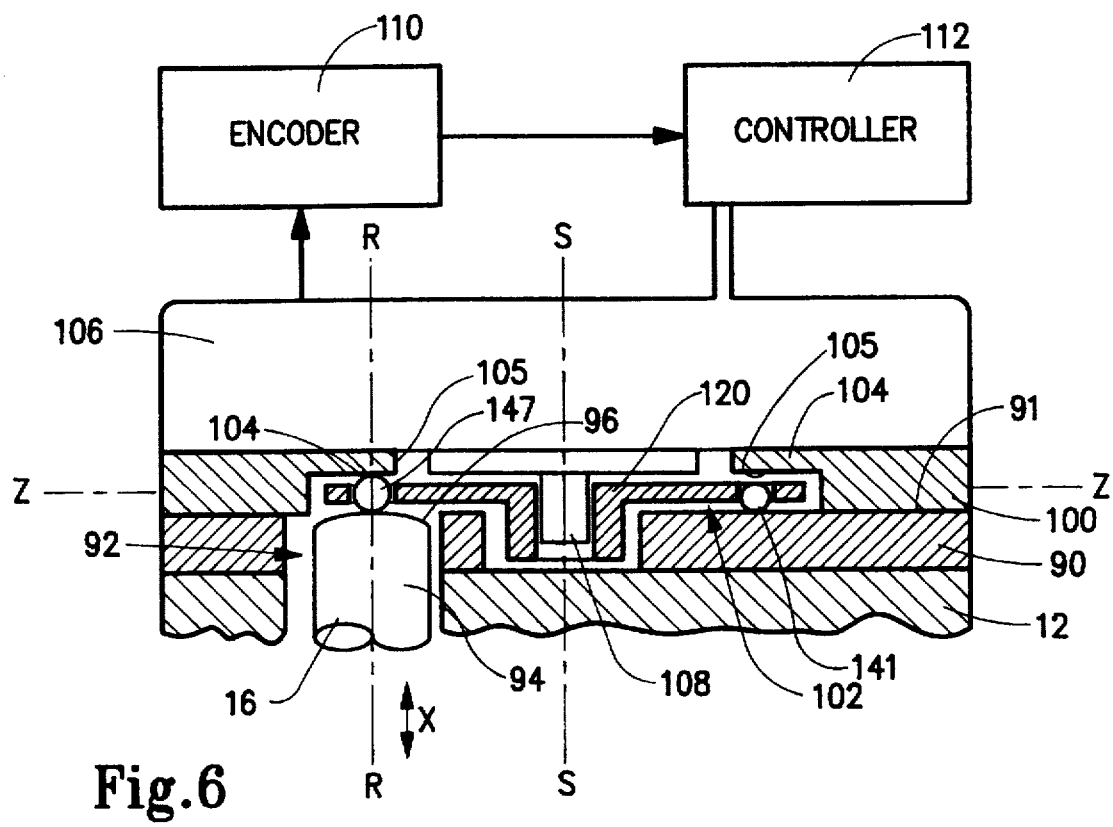
FIG. 6 is a cross-sectional view showing the cam element according to a first exemplary embodiment of the present invention.
Figure 9:
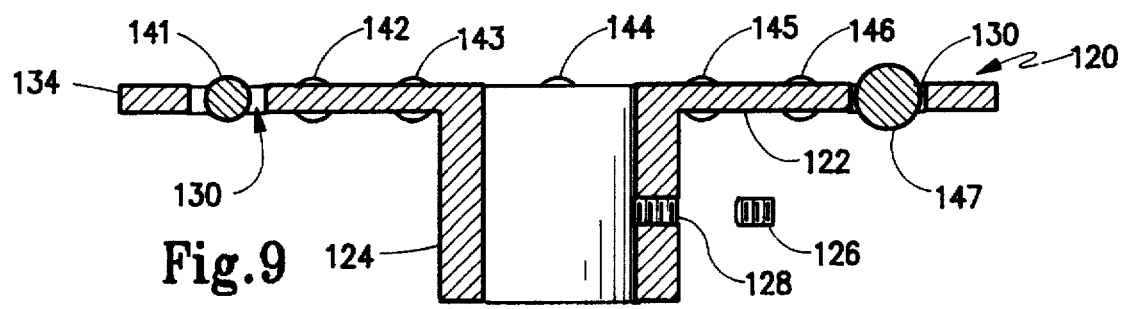
FIG. 9 is a side view in cross-section of the cam element of FIG. 8.

In either case, holes 130 each receive a ballbearing, such as ballbearings 141–147, shown in FIG. 9. Each of ballbearings 141–147 are different in diameter and, with reference to FIGS. 8 and 9, it may be appreciated that there are twelve holes 130 shown so that twelve ballbearings of different sizes would be received in these holes 130. Of course, a greater or lesser number of holes may be provided, depending on the desired number of positioning increments with eighteen (18) being the preferred number of such holes. It should now be appreciated that the ballbearings, such as ballbearings 141–147 provide a camming structure for cam element 120 that defines a discontinuous ramp when received in cavity 102 (FIG. 6). Here, it may be seen that annular rim 104 provides an annular raceway 105 so that ballbearings such as ballbearings 141 and 147 are trapped between the raceway 105 formed by rim 104 and a flat surface 91 of spacer plate 90. Thus, each ballbearing is confined in its respective hole. As shaft 108 is rotated, however, cam element 120 rotates so as to consecutively advance the ballbearings as they travel along the raceway into a location between annular rim 104 and contact surface 96 at an end portion 94 of shaft 16. Contact surface 96 thus faces the raceway 105.

Figure 7:
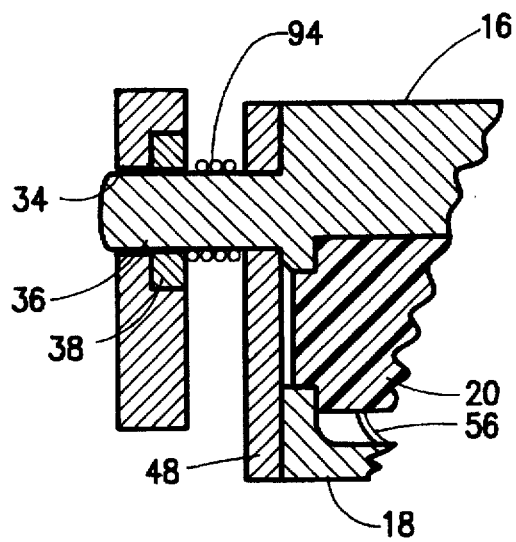
FIG. 7 is a top view in cross-section of an end portion of the movable mount for read/write head showing the biasing spring therefor.

With reference to FIGS. 3 and 7, it may be seen that shaft 16 and shuttle 18 are positively biased so that surface 96 of shaft 16 contacts a selected one of the ballbearings, such as ballbearings 141–147. This is accomplished by means of a beryllium spring 94 which is matably positioned on stub-shaft 36 of shaft 16 os that it is compressed between outer bushing 38 and one of legs 48 of shuttle 18. Spring 94 thus maintains surface 96 in contact with the set of the camming ballbearings as cam element 120 is rotated by motor 106. Accordingly, raceway 105 defines a reference plane with linear axis "L" being perpendicular to this reference plane.

From the foregoing, and in reference again to FIG. 6, it should now be appreciated that the varying diameter of the ballbearings, such as ballbearings 141–147 form a discontinuous ramp having discrete steps, as defined by each ballbearing, that varies in dimension in the direction of axis "R" and thus linear axis "L". As the advancement of the ballbearings leads to an increase in size, shaft 16 is translated against the force of spring 94 in the direction of arrow "X" away from a reference plan "Z" which correspondingly translates the transducer linearly, as well. As the advancement of cam element 120 decreases the size of the ballbearings, biasing spring 94 operates to translate shaft 16 in the direction of arrow "X" toward reference plan "Z". the diameters of the largest and smallest ballbearings then define first and second locations between which recording head 20 translates with the middle-sized ballbearings defining intermediate locations or discrete steps between the first and second locations.

Figures 8, 10, 11:
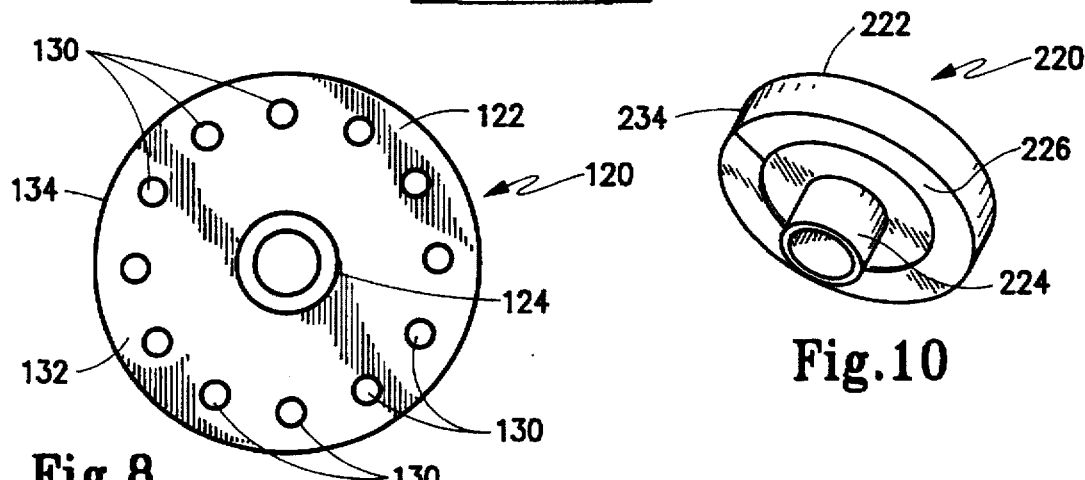
FIG. 8 is a top plan view of the cam element according to the first exemplary embodiment of the present invention.
FIG. 10 is a perspective view of a second exemplary embodiment of a cam element according to the present invention.
FIG. 11 is a side view in elevation of the cam element shown in FIG. 10.
Figures 12, 13:
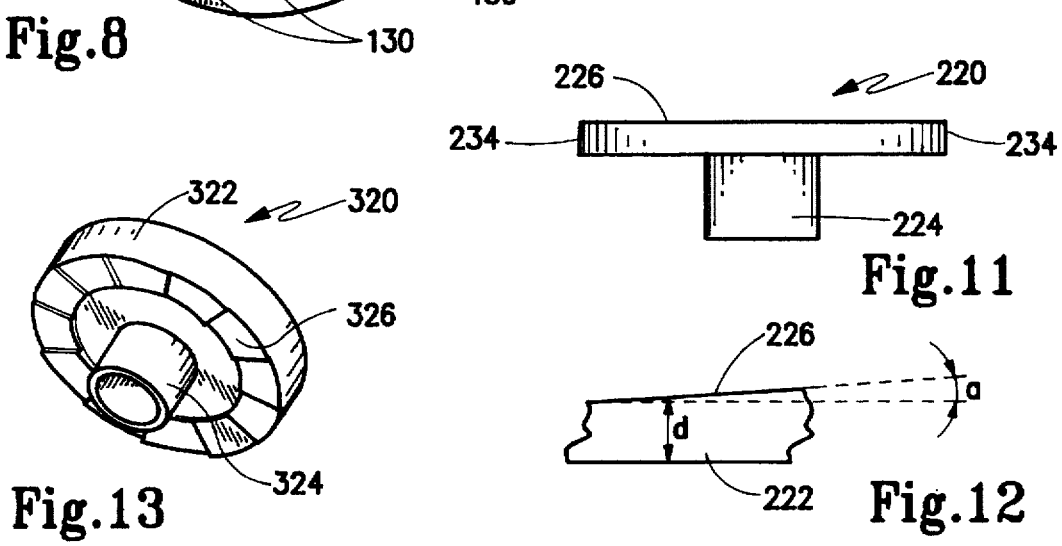
FIG. 12 is an enlarged fragmentary view of an edge of the cam element shown in FIGS. 10 and 11.
FIG. 13 is a perspective view of a third exemplary embodiment of the cam element according to the present invention.

An alternative camming element 220 is shown in FIGS. 10–12. Here, cam element 220 includes a disk section 222 and a sleeve portion 224 that is configured to be received on shaft 108 of motor 106. Here, however, the camming structure is defined by a continuous annular ramp 226 that extends circumferentially around the peripheral edge 234 of disk portion 222. With reference to FIG. 10, it may be seen that the effective thickness "d" continuously varies with a relative constant slope shown as small acute angle "a" over the majority of its distance around the periphery of disk portion 222.

Figure 14:
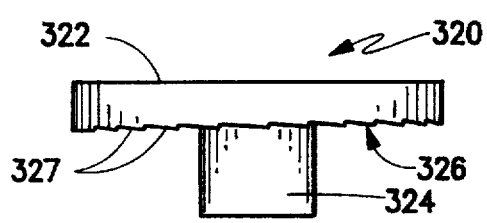
FIG. 14 is a side view in elevation of the cam element shown in FIG. 13.
Figure 15:
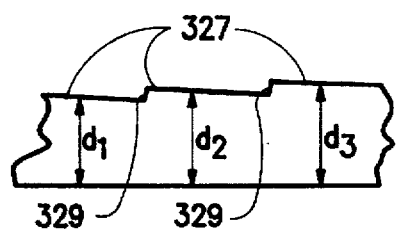
FIG. 15 is an enlarged fragmentary view of an edge of the cam element shown in FIGS. 13 and 14.

A third exemplary embodiment of cam element according to the present invention is shown in FIGS. 13–15. Here, cam element 320 is again in the form of a disk-shaped member that has a disk portion 322 and a sleeve 324 operative to secure rotatable cam element 320 onto a rotatable shaft, such as shaft 108 of motor 106. Here, however, the camming structure is defined by a stepped ramp 326 formed by a plurality of discrete steps 327 that vary in thickness, such as "$d_1 - d_3$", shown in FIG. 13. An angular incline 329 is located between each step 327 to provide transition therebetween. Steps 327 thus position recording head 20 at discrete intermediate locations between the first and second locations.

While the above exemplary embodiments show three possible camming elements which can be used to translate or set the linear distance of shaft 16, it is preferred to employ cam element 120 in the form of retainer section 122 and the camming ballbearings from both a cost precision standpoint. Inexpensive metal ballbearings which are formed to diameters maintaining high precision on the order of 0.00001 inch or better, are readily available on the market and are relatively inexpensive. Accordingly, using the diameter of these ballbearings as the camming means allows precise incremental steps of 0.001 inch to 0.002 inch. Indeed, the precision of such ballbearings allow even incremental steps of lesser dimension so that a higher density of data may be placed on the recording medium. The ramp structures 226, 326 of cam element 220, 320, respectively, while accomplishing the linear translation of shaft nonetheless would require an especially machined component having a highly precisioned machined ramp thereon. While it would certainly be possible to produce the camming elements 220, 320, such a part would greatly increase the cost of the positioning mechanism according to the present invention. Cam element 120, on the other hand, is an inexpensive solution to the need for such a precision part.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A positioning mechanism operative to selectively position a transducer along a linear axis relative to a support structure which supports said transducer, comprising:
   (a) a movable mount operative to secure said transducer relative to said support structure for reciprocal movement thereon along the linear axis between first and second locations;
   (b) a rotatable cam element oriented transversely of the linear axis, said cam element having a camming structure including a wheel that is provided with a plurality of angularly spaced openings around the rotational axis and a plurality of spherical balls respectively disposed in said openings, at least some of said balls having different diameters;
   (c) a biasing element operative to apply a force that biases said movable mount into contact with said camming structure such that, as said cam element is rotated, said balls operate to move said movable mount along the linear axis; and
   (d) a rotatable drive operative to selectively rotate said cam element about a rotation axis.

2. A positioning mechanism according to claim 1 wherein the rotation axis is parallel to the linear axis.

3. A positioning mechanism according to claim 1 wherein said rotatable drive is selected from a group consisting of: servo motors, stepper motors and solenoids.

4. A positioning mechanism according to claim 1 including an encoder operative to sense the rotational orientation of said cam element.

5. A positioning mechanism according to claim 1 wherein said cam element is a disk-shaped member, said camming structure defined by an annular ramp extending around a one surface of said disk-shaped member.

6. A positioning mechanism according to claim 5 wherein said ramp has a constant slope over a majority of its length.

7. A positioning mechanism according to claim 5 wherein said ramp is formed to include a plurality of discrete steps which vary the dimension of said cam element such that said movable mount is positioned at a plurality of discrete intermediate locations between said first and second locations as said cam element is rotated.

8. A positioning mechanism operative to selectively position a transducer relative to a reference plane formed in a support structure along a linear axis perpendicular to the reference plane, comprising:
   (a) an annular raceway formed in said support structure and oriented in a raceway plane that defines the reference plane;
   (b) a shaft defining a movable mount for said transducer and having a first end thereof facing the raceway;
   (c) a support arm disposed on said support structure, said support arm having opposed end pieces operative to support said shaft for linear translation therebetween so that said transducer is linearly translated along the linear axis;
   (d) a biasing element operative to bias said shaft toward said raceway;
   (e) a rotatable cam element journaled for rotation about a rotation axis that is parallel to the linear axis and including a disk-shaped wheel having a plurality of angularly spaced openings around the rotation axis and a plurality of differently-sized spherical balls received in respective ones of the spaced openings, said cam element being located such that, as said cam element rotates, said spherical balls travel along the raceway and are consecutively interposed between the raceway and the first end of said shaft thereby to translate said shaft; and
   (e) a drive operative to selectively rotate said cam element.

9. A positioning mechanism operative to selectively position a transducer along a linear axis, comprising:
   (a) a support structure including support arm projecting therefrom, said support arm configured as a yoke having opposed end pieces;
   (b) a movable mount disposed on said support arm and operative to secure said transducer relative to said support structure for reciprocal movement thereon along the linear axis between first and second locations, said movable mount including a shaft slideably disposed on said support arm between said end pieces for translation along a shaft axis parallel to the linear axis;
   (c) a biasing element operative to apply a restorative force that biases said movable mount toward said first location;
   (d) a cam element rotatably journaled on said support structure and oriented transversely of the linear axis, said cam element having a camming structure defined by a ramp that is maintained in contact with said movable mount, said camming structure varying in dimension in a direction parallel to the linear axis such that, as said cam element is rotated, said ramp operates to advance said movable mount along the linear axis toward the second location and against a restorative force applied by said biasing element;
   (e) a rotational position adjuster assembly associated with said shaft and operative to permit selected rotational positioning of said shaft at a selected shaft orientation, said rotational position adjuster being constructed so as to allow linear translation of said shaft along the shaft axis while maintaining said shaft at the selected shaft orientation; and
   (f) a rotatable drive disposed on said support structure and operative to selectively rotate said cam element about a rotation axis whereby said biasing element and said cam element cooperate to position said transducer at intermediate locations between the first and second locations.

10. A positioning mechanism according to claim 9 wherein said shaft has a contact portion engaging said ramp.

11. A positioning mechanism according to claim 10 wherein said contact portion is formed by a first end of said shaft, said biasing element operative to bias a second end of said shaft.

12. A positioning mechanism according to claim 9 including a shuttle disposed on said shaft for common movement therewith, said transducer including a plurality of electronic heads in linear, spaced-apart orientation with respect to one another in a head direction that is parallel to the linear axis, said transducer being secured to said carriage.

13. A positioning mechanism according to claim 9 wherein said rotational position adjuster assembly includes a longitudinal slot formed in said shaft, a ball bearing disposed in said slot, and a bearing retainer positioned transversely of said shaft and operative to trap said ball bearing against said shaft, said bearing retainer adjustable in a transverse direction thereby to rotate said shaft.

14. A positioning mechanism according to claim 9 wherein said rotatable drive is selected from a group consisting of: servo motors, stepper motors and solenoids.

15. A positioning mechanism according to claim 9 wherein said ramp has a constant slope over a majority of its length.

16. A positioning mechanism according to claim 9 wherein said ramp is formed to include a plurality of discrete steps which vary the dimension of said cam element such that said movable mount is positioned at a plurality of discrete intermediate locations between said first and second locations as said cam element is rotated.

17. A positioning mechanism according to claim 9 wherein said cam element includes a wheel that is provided with a plurality of angularly spaced openings around the rotational axis and a plurality of spherical balls respectively disposed in said openings, at least some of said balls having different diameters.

* * * * *